| (12) United States Patent<br>Lazar et al. | (10) Patent No.: US 9,803,708 B2<br>(45) Date of Patent: Oct. 31, 2017 |
|---|---|

(54) BRAKING DEVICE FOR A PASSENGER CONVEYOR

(71) Applicant: Otis Elevator Company, Farmington, CT (US)

(72) Inventors: David Lazar, Brno (CZ); Martin Vrsecky, Kojetin (CZ)

(73) Assignee: OTIS ELEVATOR COMPANY, Farmington, CT (US)

( * ) Notice: Subject to any disclaimer, the term of this patent is extended or adjusted under 35 U.S.C. 154(b) by 459 days.

(21) Appl. No.: 13/944,210

(22) Filed: Jul. 17, 2013

(65) Prior Publication Data

US 2013/0299285 A1 Nov. 14, 2013

Related U.S. Application Data

(63) Continuation of application No. 12/741,912, filed as application No. PCT/EP2007/009737 on Nov. 9, 2007, now abandoned.

(51) Int. Cl.
*B60T 1/00* (2006.01)
*F16D 63/00* (2006.01)
*B66B 29/00* (2006.01)

(52) U.S. Cl.
CPC ............ *F16D 63/006* (2013.01); *B66B 29/00* (2013.01)

(58) Field of Classification Search
USPC .... 188/31, 60, 69, 70 B, 82.7, 82.74, 82.77, 188/82.8, 166, 171; 198/323
See application file for complete search history.

(56) References Cited

U.S. PATENT DOCUMENTS

| 1,566,475 A | 12/1925 | Handy et al. |
| 2,460,017 A | 1/1949 | Lautrup et al. |

(Continued)

FOREIGN PATENT DOCUMENTS

| EP | 0557093 | 8/1993 |
| JP | 4729993 | 9/1972 |

(Continued)

OTHER PUBLICATIONS

Russian handbook entitled, "The Braking Devices," under the editorship of M.P. Alexandrov—M.: Mashinostroenlye, 1985; pp. 108-113, 206-213.

(Continued)

*Primary Examiner* — Nicholas J Lane
(74) *Attorney, Agent, or Firm* — Carlson, Gaskey & Olds

(57) ABSTRACT

This invention relates to a braking device (10) for a passenger conveyor comprising at least one movable part (12). The braking device (10) comprises a braking element (18) having a braking portion (34) engageable with the movable part (12) of the passenger conveyor. The braking element (18) is movable in a first direction into a position in which the braking portion (34) engages with said movable part (12) of the passenger conveyor. The braking element (18), in a state in which the braking portion (34) engages with the movable part (12) of the passenger conveyor, is movable in a second direction from a position of initial engagement of the braking portion (34) into a braking position of the braking element (18). The movement in the second direction is driven by movement of the movable part (12) of the passenger conveyor.

8 Claims, 4 Drawing Sheets

(56) References Cited

U.S. PATENT DOCUMENTS

| | | | |
|---|---|---|---|
| 3,871,514 | A | 3/1975 | Hewitt et al. |
| 4,175,727 | A | 11/1979 | Clarke |
| 5,277,278 | A | 1/1994 | Mehlert et al. |
| 5,346,046 | A | 9/1994 | Peters |
| 6,446,769 | B1 | 9/2002 | Kangiser et al. |
| 6,732,969 | B2 | 5/2004 | Tanji et al. |
| 7,607,518 | B2 | 10/2009 | Ito |
| 2007/0170409 | A1* | 7/2007 | Ito .................................. 254/375 |
| 2008/0017456 | A1 | 1/2008 | Ito |

FOREIGN PATENT DOCUMENTS

| | | |
|---|---|---|
| JP | 11021061 A | 1/1991 |
| JP | 2002327779 | 11/2002 |
| JP | 2005 162390 | 6/2005 |
| JP | 2006 143424 | 6/2006 |

OTHER PUBLICATIONS

International Search Report for PCT Application No. PCT/EP2007/009737 dated Jul. 29, 2008.

* cited by examiner

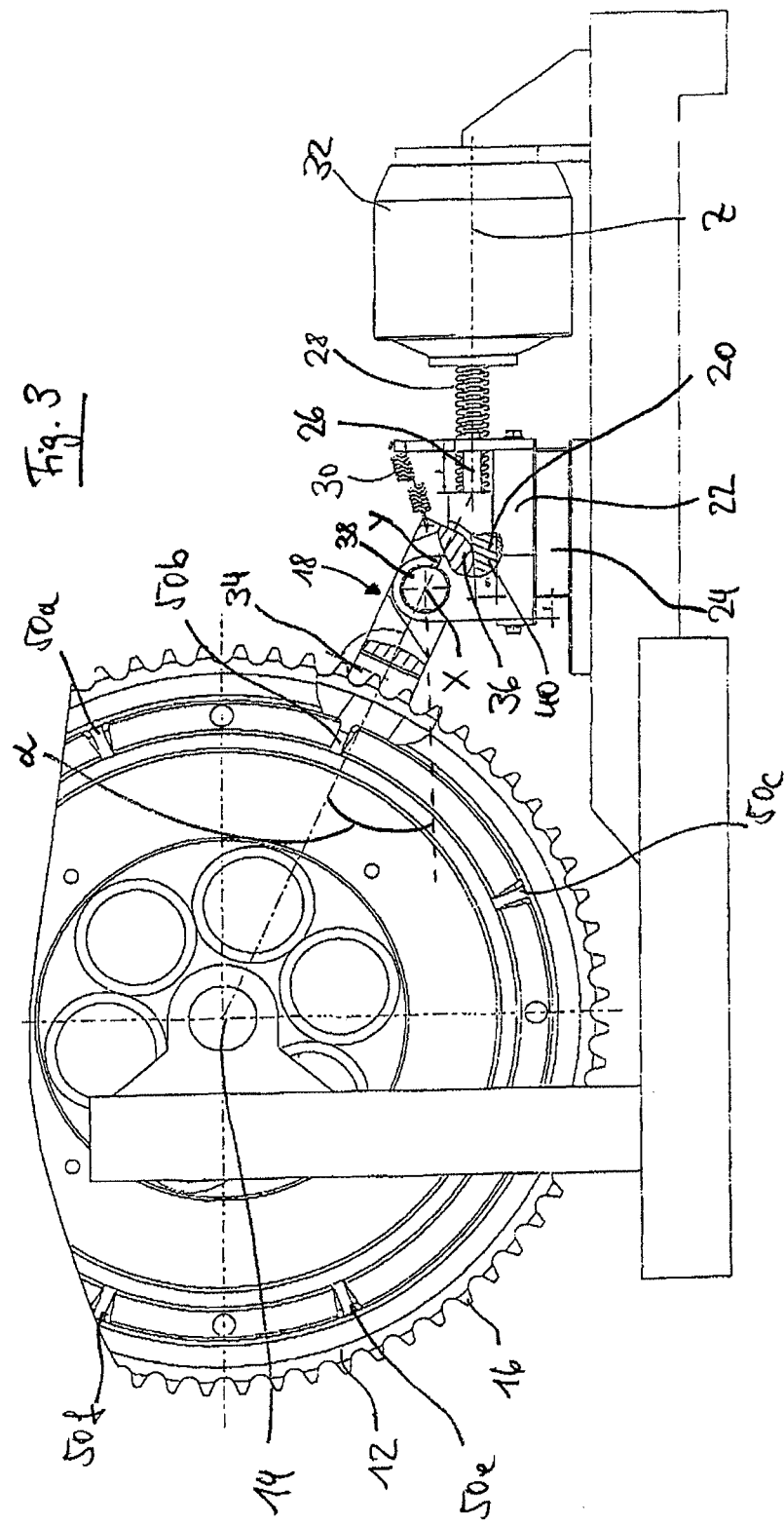

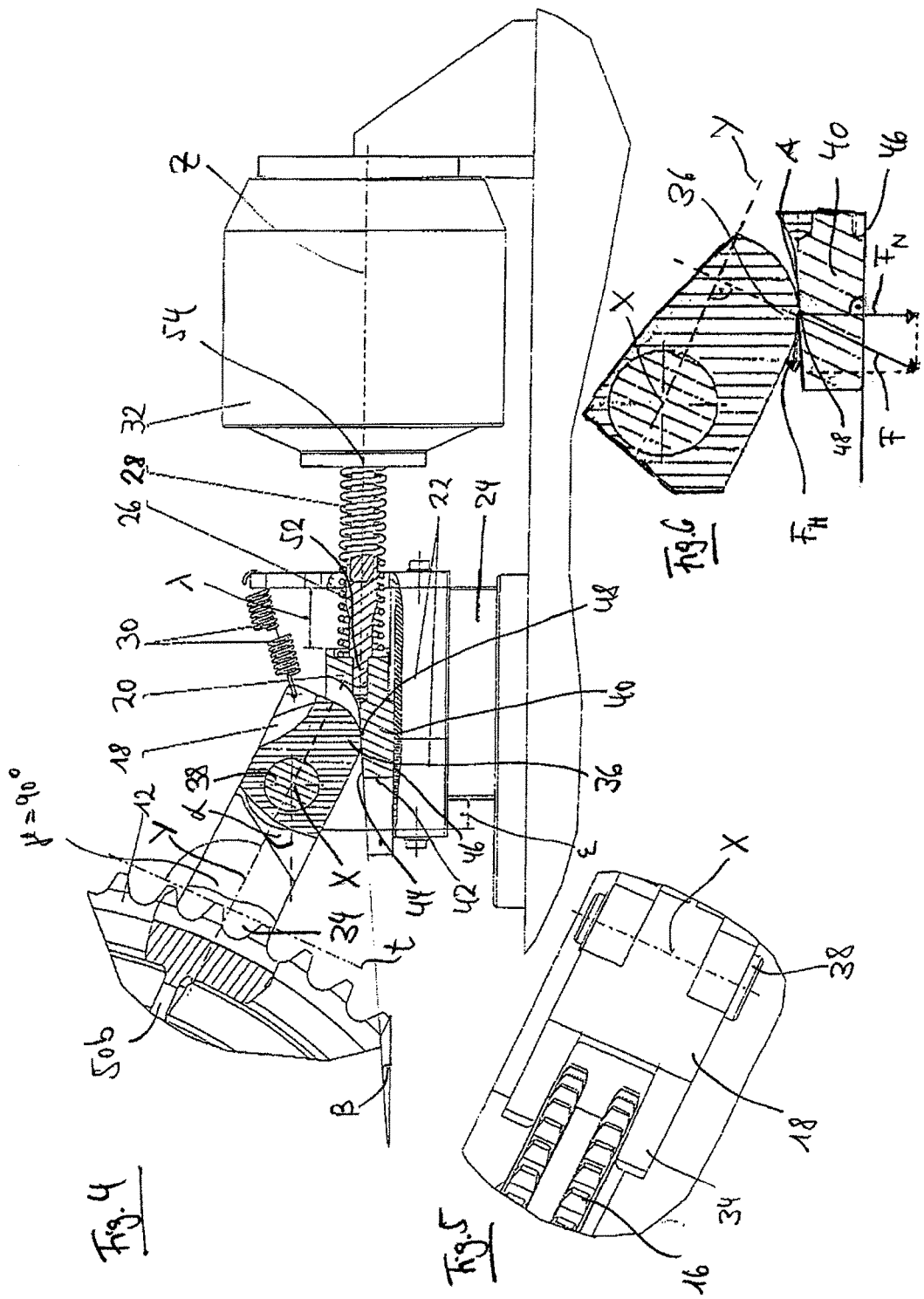

BRAKING DEVICE FOR A PASSENGER CONVEYOR

The present invention relates to a braking device for a passenger conveyor, particularly to a braking device to be used as an auxiliary brake of a passenger conveyor in an emergency or otherwise abnormal situation.

Passenger conveyors are e.g. escalators or moving walkways. Escalators are passenger conveyors that typically carry passengers between landings at different levels in buildings, for example. Moving walkways are usually used to carry passengers along levels extending horizontally or with only slight inclination.

An escalator or moving walkway typically includes a frame, balustrades with movable handrails, tread plates, a drive system and a step chain for propelling the tread plates. The step chain travels in an endless way between guide sheaves located at an upstream landing and a downstream landing, respectively. The frame includes a truss section on both left and right hand sides of the frame. Each truss section has two end sections forming landings, connected by an inclined or—in case of a moving walkway—possibly also horizontal midsection. One of the landings, e.g. in case of an escalator usually the upper landing, houses the drive system or machine of the passenger conveyor positioned between the trusses.

The drive system of an escalator or moving walkway typically comprises the step chain, a step chain drive sheave (e.g. in the form of a sprocket or toothed wheel), an axle and a drive motor. The step chain travels a continuous, closed loop, running from one landing to the other landing, and back. To the step chain the tread plates are attached. The drive motor drives the drive sheave which is, directly or via a further transmission, in a driving connection with the step chain. Commonly the final drive is realized as a pair of sheaves located in a turn around area. The drive sheaves are based on tread plate size and are commonly of a 750 mm diameter for most escalator systems. The drive sheaves drive the step chain. Alternative approaches involve one or more machines located in the escalator incline or midsection of the moving walkway. These machines also drive the step chain via a drive sheave.

There are a variety of conditions when a brake should be activated to automatically stop or prevent further movement of the step chain. For example, in an escalator, when there is a failure of drive transmission between the motor and the step chain, there is a need to control the position of the escalator steps, since without the motive force of the motor, normal gravitational forces may cause undesirable movement of the escalator steps.

For any passenger conveyor, further an auxiliary braking device should be available for being activated under abnormal conditions. Such auxiliary braking device should allow safe stopping of any moving parts of the passenger conveyor, particularly the step chain and the tread plates, and holding these parts in a stationary condition, until the abnormal condition is resolved. It is important for the auxiliary braking device that it can be activated reliably even in case of complete failure of the drive system of the passenger conveyor and/or its control, and is able to maintain a blocked condition for considerable time.

Known constructions for an auxiliary brake include a wedge-type construction and a calliper-typer construction.

The wedge-type construction is mechanically controlled and uses a wedge biased by a spring such as to be pushed by the spring between a brake disc and a stationary member, usually a crossbar, upon activation. The wedge-type construction provides a self-locking effect for the auxiliary brake, as the rotary movement of the brake disc will induce further movement of the wedge between the brake disc and the stationary member, once sufficient friction fit between the brake disc and the wedge is established. However, for releasing the auxiliary brake and returning back the passenger conveyor to the stand-by position the passenger conveyor has to be started and operated for a short period of time in reverse direction. This is cumbersome.

The calliper-type construction is electrically controlled and uses a brake lever which, upon activation, falls under its own gravity onto a brake disc to apply a braking force on the brake disc. For sufficient performance, the brake disc needs to have a well defined shape, and thus is complicated to manufacture, and further the brake lever needs to have substantial weight. Thus, a large force is necessary to bring the brake lever from its activated position back into its inactivated position to return the passenger conveyor into its stand-by condition. Hence, the caliper-type construction is costly and requires considerable space, particularly for the drive.

It is desirable for such auxiliary braking devices to require a minimum of power for activation and maintenance of a blocked condition, as well as for resetting the brake system into an inactive stand-by condition. Particularly, the auxiliary braking device should provide a self-locking effect when being activated. Furthermore, it would be beneficial if the auxiliary braking device provides the possibility of easy and convenient restart of the passenger conveyor.

An exemplary embodiment of this invention provides a braking device for a passenger conveyor comprising at least one movable part. The braking device comprises a braking element having a braking portion adapted to be engaged with the movable part of the passenger conveyor. The braking element is movable in a first direction into a position in which the braking portion engages with the movable part of said passenger conveyor. The braking element, in a state in which the braking portion engages with the movable part of the passenger conveyor, is movable in a second direction from a position of initial engagement of the braking portion into a braking position of the braking element. The movement of the braking element in the second direction is driven by movement of the movable part of the passenger conveyor.

A further exemplary embodiment of this invention provides a passenger conveyor including a braking device, particularly an auxiliary braking device, as outlined above.

Exemplary embodiments of the invention will be described in greater detail below taking reference to the accompanying drawings.

FIG. 3 shows in a side elevation the embodiment of FIGS. 1 and 2 in an activated state;

FIG. 4 shows an enlarged view of the embodiment in the activated state according to FIG. 3 partly in cross section;

FIG. 5 shows a plan view on a detail of the embodiment shown in FIG. 4; and

FIG. 6 shows an enlarged detail of FIG. 4.

Figure 1:
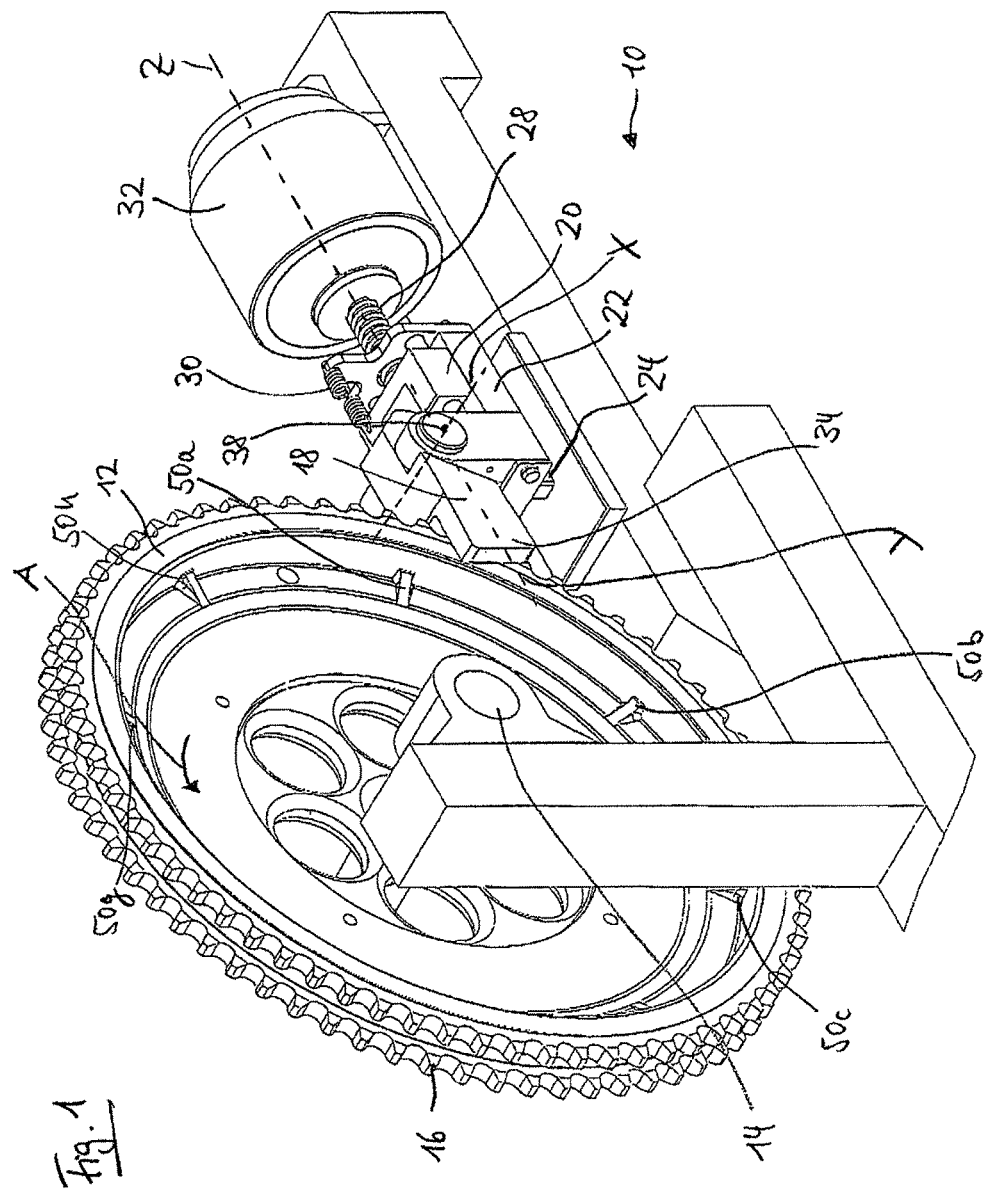
FIG. 1 shows in a perspective view an embodiment of an auxiliary braking device in an inactivated state.

In FIG. 1 and in all subsequent Figures an auxiliary braking device according to an embodiment is generally designated by 10. FIG. 1 shows in a perspective view the auxiliary braking device 10 in an inactivated state. 12 depicts a sprocket of an escalator or a moving walkway, both of which are possible embodiments of a passenger conveyor. The sprocket 12 is supported rotatably around a shaft 14, which shaft 14 is directly or via a transmission connected to a drive motor (not shown) of the passenger conveyor. Operation of the drive motor thus will rotate the sprocket. The sprocket 12 drives a step chain (not shown) of the passenger conveyor. For example, an endless drive belt (not shown) may be passed around the sprocket 12 such as to engage with radially projecting teeth (one of which is designated by 16 in FIG. 1) provided around the periphery of the sprocket 12. In operation, the drive belt engages with the step chain of the passenger conveyor, such that the step chain will travel in an endless way between the one of landings of the passenger conveyor at which the sprocket 12 is located (for example, the upper landing in case of the passenger conveyor being an escalator), and the other one of landings of the passenger conveyor. In this way the sprocket 12 defines a plane perpendicular to the shaft 14 in which plane the step chain of the passenger conveyor will travel.

The sprocket 12 may be connected directly with the output shaft of the driving motor, e.g. an electric motor, such as to be driven by rotation of the output shaft. Alternatively, such driving connection might be realized via a transmission, for example by way of an output sheave fixedly coupled with the output shaft of the drive motor (which may also be an electric motor), a motor drive belt passed around the output sheave and also passed around a main drive sheave (not shown) of large diameter, the main drive sheave being coupled in a rotatably fixed relation with the sprocket 12. e.g. the main drive sheave may be secured in a rotatably fixed relation to the shaft 14 or may be formed integrally with the sprocket 12. In the illustrated example, during normal operation of the passenger conveyor, i.e. in the inactivated position of the auxiliary braking device 10 or any other braking device, the sprocket 12 rotates in counter-clockwise direction, as is indicated by arrow A in FIGS. 1 and 2.

The auxiliary braking device 10 comprises a braking element 18, a slider 20 having the function of a stopping element, a supporting member 22, a base 24, a rod (see FIGS. 3 and 4), a main spring member 28, a return spring member 30, and a solenoid 32 having the function of an actuating element for the auxiliary braking device 10.

The braking element 18 has an elongated shape with a longitudinal axis indicated at Y. A braking portion 34 is formed at the one longitudinal end of the braking element 18, and an abutment portion 36 (see FIG. 2) is formed at the opposite longitudinal end of the braking element 18. The braking element 18 is supported by the support member 22 via a hinge 38 such as to be rotatable around a swivel axis (indicated at X) between an inactivated position (depicted in FIGS. 1 and 2) and a braking position (depicted in FIGS. 3 to 5). As will be outlined in more detail below, rotation of the braking element 18 around the axis X defines a second direction into which the braking element 18 is movable. The rotational movement of the braking element 18 is such that in the inactivated position of the braking element 18 its longitudinal axis Y extends substantially horizontal, and in the braking position of the braking element 18 its longitudinal axis Y extends at an angle α of about 25 degrees with respect to the horizontal direction (see FIGS. 3 and 4).

As will be outlined in more detail below, the braking element 18 together with the support member 22 is also movable in a first direction (or, more precisely, in a first linear direction), namely in the embodiment shown, in the horizontal direction, in order to bring the engagement portion 34 of the braking element 18 into engagement with a braking structure 50a-50h provided in one of the side faces of the sprocket 12. The braking structure 50a-50h comprises a number of projections 50a-50h projecting in direction of the shaft 14 outwardly from the side face of the sprocket 12. The projections 50a-50h follow each other around the periphery of the sprocket 12. In the illustrated example there is an angular distance of about 45° between subsequent two of the projections 50a to 50h, respectively. Although in the embodiment shown in the Figures only one braking structure 50a-50h is provided in one of the side faces of the sprocket 12, it will be understood that a same structure may also be provided in the opposite side face of the sprocket 12, which side face is not visible in the Figures, in case two-side engagement of the braking structure with the engagement portion 34 of the braking element 18 is desired.

As is best visible in FIGS. 3 and 4, the slider 20 has a wedge-shaped portion 40 extending substantially horizontally with the tip part 42 of the wedge-shaped portion 40 pointing to the sprocket 12. The bottom side 46 of wedge-shaped portion 40 is slidably supported on the top side of the support member 22, and thus extends substantially horizontal. The upper side 44 of the wedge-shaped portion 40 is inclined with respect to the bottom side 46 at an angle β of about 5°. The upper side 44 of the wedge-shaped portion 40 has formed therein an abutment portion 48 which, in the braking position of the braking element 18 (as depicted in FIGS. 3 and 4) comes into abutment with the abutment portion 36 formed at the braking element 18.

Figure 2:
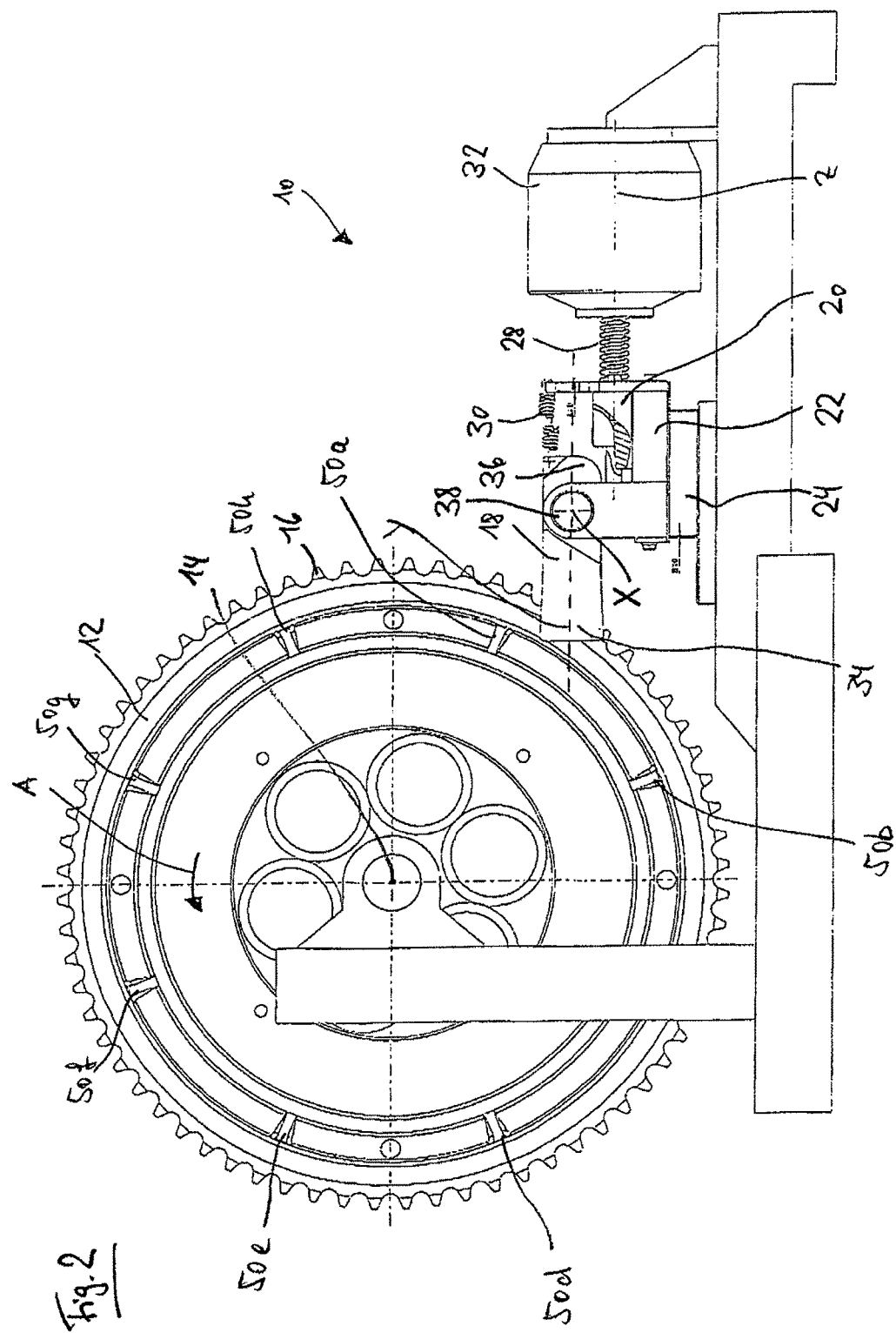
FIG. 2 shows in a side elevation the embodiment of FIG. 1 in an inactivated state.

Opposite from the wedge-shaped portion 40 in horizontal direction, i.e. in a direction away from the sprocket 12, one end 52 of the rod 26 is fixedly secured within a recess formed in the slider 20. The rod 26 extends substantially horizontally and has its opposite end 54 inserted into the solenoid 32 which acts as an electrically operated actuating element. The coil spring 28 acting as a main spring surrounds the rod 26 and has its one longitudinal end in abutment against the slider 20 and its opposite end in abutment against the housing of the solenoid 32. Thus, the main spring 28 provides a bias force biasing the slider 20 in a second linear direction defined by the longitudinal axis Z of the rod 26 and the longitudinal axis of the slider 20 away from the housing of the solenoid 32 and towards the sprocket 12. This bias force is compensated by the solenoid 32 fixing the length of the rod 16 extending beyond the housing of the solenoid 32. By energizing the solenoid 32 a force is produced pulling the rod 16 into the housing of the solenoid 32, and thus the length of the rod 16 extending beyond the housing can be reduced accordingly. Therefore, in a fully energized condition of the solenoid 32 the slider 20 will be in its most rightward position as shown in FIGS. 1 and 2 (i.e. its position most remote from the sprocket 12 in the second linear direction). In this position the braking portion 34 of the braking element 18 cannot engage with the braking structure 50a-50h of the sprocket 12, and thus this position defines the inactivated "stand-by" position of the slider 20 and the braking device 10 as a whole. In a fully de-energized condition of the solenoid 32 the slider will be in a position closest to the sprocket 12 in the second linear direction. As will be outlined below, bringing the slider 20 into this position will activate the auxiliary braking device 10 and subsequently bring the braking element 18 into its braking position depicted in FIGS. 3 to 6.

The slider 20 is supported by the support member 22 such as to be slidable within a certain range in the second linear direction as defined by the axis Z of the rod 16. Also the support member 22 itself is supported on the base 24 such as to be slidable within a certain range in the second linear direction. The support member 22 may e. g. comprise a linear guide arrangement engaging with a corresponding structure of the slider 20 and allowing relative movement within the given range of the slider 20 with respect to the support member 22 in the second linear direction towards and away from the sprocket 12. This relative movement may e.g be restricted by respective left and right abutments of the linear guide arrangement. Therefore, actuation of the rod 16 by energizing or de-energizing the solenoid 32 first will cause a movement in the second linear direction of the slider 20 relative to the support element 22 with the support element 22 being fixed relative to the base 24. After the slider 20 has reached the left or right abutment, further movement of the rod 16 in the second linear direction will cause a corresponding movement in the second linear direction of the support member 22 together with the slider 20 towards or away from the sprocket 12. This movement will therefore also bring the braking element 18 closer to the sprocket 12 or farther away from the sprocket 12.

Actuation of the auxiliary braking device 10 for activation and release of a braking state thereof is as follows:

As outlined above, in normal operation with inactivated auxiliary braking device 10, the solenoid 32 will be energized electrically to pull the rod 16 into its most retracted position within the housing of the solenoid 32. Thus, the slider 20 will be in its most rightward position according to FIGS. 1 and 2 (i.e. its position most remote from the sprocket 12 in the second linear direction), and the braking element 18 cannot engage with the braking structure 50a-50h of the sprocket 12. The sprocket 12 will be rotating in counterclockwise direction (see arrow A).

To activate the auxiliary braking device 10, the solenoid 32 is de-energized. Under the tension of the main spring 28 the rod 16 will then extend from the housing and move the the slider 20 in the second linear direction towards the sprocket 12. In a first stage, the slider 20 will move with respect to the support member 22 which remains fixed with respect to the base 24. Thus, the wedge-shaped portion 40 of the slider 20 will move under the abutment portion 36 of the braking element 18. In a second stage, after the slider 20 has come into abutment with a corresponding left abutment of the support member 22, both the support member 22 and the slider 20 will move further towards the sprocket 12 in the second linear direction. As the braking element 18 (which in this stage is aligned horizontally, i.e. with its longitudinal axis Y extending in the second linear direction) is supported via hinge 38 by the support member 22, movement in the second stage will bring the braking element 18 closer to the sprocket 12. This movement of the braking element 18 defines a first linear direction which in the present embodiment is identical with the second linear direction defined by movement of the slider 20. Note, however, that in other embodiments the first and the second linear direction may differ from each other.

Finally the movement of the braking element 18 in the first linear direction will result in the engagement portion 34 of the braking element 18 coming into engagement with one 50b of the protrusions 50a-50h of the braking structure provided in the side face of the sprocket 12 around the periphery thereof. Engagement of the braking element 18 with the protrusion 50b of the sprocket 12 still rotating in counterclockwise direction (see arrow A) will cause the braking element 18 to be swiveled around hinge 38 in clockwise direction, such that the angle α under which the longitudinal axis Y of the braking element 18 extends with respect to the second longitudinal direction will increase. Since the hinge 38 is located between the end of the braking element at which the engagement portion 34 is formed and the end of the braking element opposite the engagement portion 34, at which end the abutment portion 36 is formed, and is also located in larger height than the upper side 46 of the wedge shaped portion 40 of the slider 20 (i.e. the hinge 38 is offset in a direction perpendicular to the first direction with respect to the upper side 46 of the wedge-shaped portion 40), the swivel movement of the braking element 18 in clockwise direction will cause the abutment portion 36 to move towards the wedge-shaped portion 40 of the slider 20. Thus at a final stage of the swivel movement, the abutment portion 36 will abut a corresponding abutment portion 48 formed in the upper side 44 of the wedge-shaped portion 40 of the slider 20. This will bring the braking element 18 into its braking position in which the braking element 18 cannot swivel further in the clockwise direction, but still is in engagement with the sprocket 12. Thus in the braking position of the braking element 18 also rotation of the sprocket 12 in counterclockwise direction is stopped by the braking element 18 being wedged between the sprocket 12 on the one side and the wedge-shaped portion 40 on the other side. In the braking position the angle α will be around 25 degrees, and the braking element 18 will have a substantially tangential orientation with respect to the periphery of the sprocket 12 with the longitudinal axis Y of the braking element being directed substantially perpendicular to to the periphery of the sprocket 12 (angle γ in FIG. 4=90 degrees).

Further, as shown in the Figures, preferably the hinge 38 is located such that the distance from the hinge 38 to the abutment portion 36 is smaller than the distance from the hinge 38 to the braking portion 34, and therefore the braking force applied by the sprocket 12 to the slider 20 will be even increased by the ratio of the distance from the hinge 38 to the braking portion 34 to the distance from the hinge 38 to the abutment portion 36.

The wedging effect in the braking position of the braking element 18 is even self-locking, as can be most clearly seen in FIGS. 4 and 6. In point A, in which in the braking position of the braking element 18 the abutment portion 36 of the braking element 18 and the abutment portion 48 of the wedge-shaped portion 40 contact each other, the braking element 18 applies a Force F to the wedge-shaped portion 40 having a component $F_N$ orthogonal to the lower surface 46 of the slider 20 and a component $F_H$ parallel to the lower surface 46 of the slider 20. The component $F_N$ orthogonal to the lower surface 46 will react completely on the frame of the passenger conveyor via slider 20. Since the hinge 38 is located higher than the abutment portion 48 formed in the upper surface of the wedge-shaped portion 40, the component $F_H$ is directed towards the sprocket 12 (see FIG. 6). Therefore, the sprocket 12, in the braking position of the braking element 18, will apply a force to the wedge-shaped portion 40 of the slider 20 urging the slider 20 in the second linear direction towards the sprocket 12. This will even amplify the braking effect and provide stable maintenance of the braking position once it is established. The full braking force will be maintained even in case the actuating force applied by the main spring 28 to the slider 20 is released (e.g. by energizing the solenoid 32).

The maximum braking force applicable by the auxiliary braking device 10 is only limited by the breaking resistance of the auxiliary braking device 10, particularly the braking element 18 and slider 20. Neither the maximum braking force nor the maximum time this braking force can be maintained depends on the energization state of the solenoid 32. Therefore, the passenger conveyor can be maintained in braking state independent of whether electrical energy is applied to the solenoid 32 or not. Rather, solenoid 32 and main spring 18 are only necessary to move the slider 20 and braking element 18 into an activated position in which engagement of the engagement portion 34 with the braking structure 50 is possible. The force necessary to provide this activation of the auxiliary braking device can be much lower than the braking force actually to be applied by the braking element 18 to stop the passenger conveyor.

Releasing the braking state of the auxiliary braking device is possible with the sprocket 12 rotating reverse direction clockwise direction in the embodiment shown in the Figures) as well as with the sprocket 12 running in in normal direction (=anticlockwise direction in the embodiment shown in the Figures).

In case the sprocket 12 is running in the reverse direction, the sprocket 12 will swivel the braking element 18 in anticlockwise direction back towards its inactivated position (horizontal direction in the embodiment shown in the Figures). Thus energizing the solenoid 32 again to retract the slider 20 and the braking element 18, i.e. to move the slider 20 and the braking element 18 in the second linear direction away from the sprocket 12, will bring the the engagement portion 34 of the braking element 18 and the braking structure 50 out of engagement. To do this it is sufficient to slightly diminish the bias force applied by the main spring 28, and hence only a comparatively weak energization of the solenoid 32 is necessary. As soon as the braking element 18 is not engaged any more with the sprocket 12, the return spring 30 will swivel the braking element 18 back into its original inactivated position (horizontal position in the Figures), and energization of the solenoid 32 will retract slider 20 and braking element 18 into the inactivated position shown in FIGS. 1 and 2.

However, the auxiliary braking device 10 can be released also with sprocket 12 running in the forward direction. In this case the sprocket 12 will apply a force to swivel the braking element 18 in clockwise direction. Therefore, to release the brake, the slider 20 is retracted, i.e. moved in the second linear direction away from the sprocket 12 by energizing the solenoid 32. After energizing the solenoid 32, retraction of the rod 28 into the housing of the solenoid 32 will in a first stage cause only the slider 20 to move with respect to the supporting member 22 in the second linear direction away from the sprocket 12 with the braking element 18 still engaging the braking structure 50. Because of the inclination of the wedge-shaped portion 40, now the sprocket 12 can swivel the braking element 18 further in clockwise direction and the angle $\alpha$ will further increase, with the consequence that the engagement of the engagement portion 34 with the braking structure 50 diminishes more and more.

The solenoid 32 will still be energized to retract the slider 20 further, such that the slider 20 comes into abutment with the right abutment of the support member 22 and subsequently the slider 20 together with the support member 22 is retracted back into the original inactivated position. This will finally bring the braking element 18 completely out of engagement with the brake structure 50, and hence release the auxiliary brake 10. The return spring 30 will then, together with the weight of the braking element 18, restore the original inactivated state of the braking element 18.

The force necessary to retract the slider 20 in the initial stage of the releasing process of the auxiliary braking device 10 is substantially lower than the braking force necessary to break the passenger conveyor, and even in the same order as the actuating force necessary to activate the auxiliary braking device 10. This even applies in the case of the sprocket 12 running in the forward direction during release of the brake, since to retract the slider 20 basically only the (rather small) horizontal component $F_H$ of the force applied to the wedge shaped portion 40 by the sprocket 12 via the braking element 18 and the normal component $F_N$ of this force multiplied by a coefficient of friction has to be compensated by the main spring and solenoid 32 (see FIG. 6).

The exemplary embodiment as described above provides a wedge-type braking device for a a passenger conveyor that can be activated by a small and compact drive mechanism requiring only low power. Only comparatively small activating forces and/or releasing forces are necessary to activate the braking device and/or to release a braking state thereof. Further, the braking device, once activated, can be reset from its braking state into its deactivated state while running the passenger conveyor in either direction. The forces necessary for releasing the braking state can be kept rather low, irrespective of whether the passenger conveyor is operated in forward or reverse direction when releasing the braking state. Due to the small activating and releasing forces a small and compact actuating device can be used. In an example the braking device can be electrically controlled to activate the braking device and/or release an activated state thereof by means of an electric drive means, such as a solenoid.

The braking device comprises a braking element having a braking portion engageable with a movable part of the passenger conveyor. The braking element is movable in a first direction into a position in which the braking portion engages with the movable part of the passenger conveyor and the braking element. In a state in which the braking portion engages with the movable part of the passenger conveyor, the braking element is further movable in a second direction from a position of initial engagement of the braking portion into a braking position of the braking element. The movement of the braking element in the second direction is driven by movement of the movable part of the passenger conveyor. Thus an activation process (inducing the braking device to enter a braking state) and/or a deactivation process (inducing the braking device to release the braking state thereof) of the braking device can be seen to involve a movement of the braking element in the first direction, while the braking process as such will involve movement of the braking element in the second direction. By providing different movements of the braking element for activation/deactivation and braking, respectively, it becomes possible provide separate drives to each of these movements. Particularly, the movement of the braking element in the first direction, which generally will have to be provided by an external drive (e.g. an electrically controlled drive), can be defined such as to require only a small actuating force. In contrast, to provide a large braking force, the movement of the braking element in the second direction can be driven by the drive of the passenger conveyor itself. Thus a compact triggering and actuating mechanism having only low force requirements can be used for the braking device. Such actuating mechanism can e.g. comprise a small electromagnetic drive such a solenoid.

If the braking element is movable also in direction opposite to the first direction, the braking device, once it has been actuated, can be reset by a applying a comparatively low actuating force in direction opposite to the first direction.

In exemplary embodiments the passenger conveyor may be an escalator or a moving walkway. The passenger conveyor may comprise a sheave, e.g. a pulley or a sprocket, around which an endless traction element, e.g. a step or pallet chain, for driving the passenger conveyor is passed. In this case the movable part of the passenger conveyor may be provided by the sheave or a part fixedly connected with the sheave. The sheave may be a drive sheave or traction sheave driven by a drive unit of the passenger conveyor, such that the drive sheave drives, directly or via a transmission mechanism, the endless traction element driving the passenger conveyor. In this case the movable part may be provided by the drive sheave itself or by a component connected in the drive train of the drive sheave. The endless traction element might e.g. be formed as a step belt/step chain of an escalator or a running belt/pallet chain of a moving walkway.

When the movable part of the passenger conveyor has a circular periphery, the braking element when being in the braking position may have a substantially tangential orientation with respect to the periphery of said movable part. This allows an optimum transfer of driving force from the movable part to the braking element in the braking state thereof to maintain the braking state. Further, for releasing the braking state, the braking element can move in forward direction with respect to movement of the movable part as well as in reverse direction with respect to movement of the movable part.

In one exemplary embodiment the movable part of the passenger conveyor is provided with a brake disc structure in at least one lateral side face thereof. This brake disc structure may be provided around the periphery of the movable part and might be engageable in a friction fit or/and form fit manner with braking portion of the braking element. e.g. the brake disc structure might comprise a number of brake portions following each other in angular intervals around the periphery of the movable part.

In a further exemplary embodiment the braking device may further comprise a support member supporting the braking element in such a way that the braking element is movable in the second direction. In such arrangement the support member itself might be movable in the first direction between an inactivated position in which the braking portion of the braking element is out of engagement with the movable part of the passenger conveyor, and an activated position in which the braking portion of the braking element comes into engagement with the movable part of the passenger conveyor.

In a still further exemplary embodiment the braking device might comprise a return spring member arranged such as to bias the braking element towards an inactivated position in which the braking portion is out of engagement with the movable part of the passenger conveyor. After releasing the braking state of the braking device such release spring member can assure that the braking element will return into its original deactivated position.

In a still further exemplary embodiment the first and the second direction may be different from each other, e.g. the first direction may be a linear direction and the second direction may be directed in direction of the circumference of a circle.

In a further exemplary embodiment, the braking element may be supported such as to be swivable around a swivel axis substantially perpendicular to a plane of movement of the movable part of the passenger conveyor and the second direction may be directed circumferentially with respect to the swivel axis. For example, the braking element may be swivable around the swivel axis at an angle between 10 and 45 degrees, or more precisely at an angle between 20 and 30 degrees, even more precisely at an angle of about 25 degrees, between the position of initial engagement of the braking portion with the movable part of the passenger conveyor and the braking position of the braking element.

In a further exemplary embodiment the first direction is defined by a first linear direction, and the braking element may be movable in the first linear direction to bring the braking portion into engagement with the movable part of the passenger conveyor. This allows a number of devices and arrangements to be used for moving the braking portion in the first linear direction, in order to activate the braking device. Particularly electrical actuating devices can be used, e.g. devices using a solenoid and an armature movable in linear direction according to the energizing state of the solenoid.

To provide a reliable braking state in which the braking element is maintained in the braking position even for longer time periods, after the braking device has been actuated, in a still further exemplary embodiment the braking device further may comprise a stopping member, and the braking element may further have an abutment portion arranged such that movement of the braking member in the second direction from the position of initial engagement of the braking portion to the braking position of the braking element brings the abutment portion into abutment with the stopping member. To allow the braking element to move from its original position in its braking position after the braking portion thereof has come into engagement with the movable part of the passenger conveyor, in an example the swivel axis around which the braking element is swivable may be offset in a direction perpendicular to the first direction with respect to the abutment portion of said wedge-shaped portion.

The stopping member may be stationary. However, activation of the braking element to induce movement of the braking element to take the braking position and/or to release from the braking position position might be facilitated when the the stopping element itself is movable in a second linear direction. e.g. the second linear direction may extend substantially parallel to the plane of movement of the movable part of the passenger conveyor. In one example the second linear direction may be the horizontal direction. The first linear direction may be parallel to the second linear direction or the second linear direction might be even equal to the first linear direction. In this case it will be convenient if the movements of the braking element in the first linear direction and of the stopping element in the second linear direction are be actuated by a same actuating member.

In further exemplary embodiments the stopping member may comprise a wedge-shaped portion defining an abutment face against which the abutment portion of the braking element abuts in the braking position thereof. The abutment face may be defined on a face of the wedge-shaped portion tapering towards the movable part of the passenger conveyor with respect to the second linear direction. For example, the abutment face may be inclined with respect to the second linear direction at an angle between 1 and 20 degrees, or more precisely at an angle between 3 and 10 degrees, and even more precisely at an angle of about degrees. A particular advantage of the wedge-shaped form of the stopping element is that releasing of the braking element from its braking position is facilitated in a situation in which the moving part is moved in forward direction while releasing the braking element from the braking position, since retraction of the stopping element in a direction opposite to the second linear direction, i.e. a direction away from the movable part, will allow the braking element to be driven by the movable part for movement in the second direction beyond the braking position of the braking element.

In a further exemplary embodiment, the stopping element may be supported by the support member such as to be slidable back and forth in the second linear direction. Further, for example the support member may comprise a first abutment portion restricting movement of the stopping element in the second linear direction towards the movable part of the passenger conveyor, and the support member may comprise a second abutment portion restricting movement of the stopping element in the second linear direction away from the movable part of said passenger conveyor. In this embodiment the first and second abutments are offset from each other in the second linear direction.

A further exemplary embodiment relates to a passenger conveyor comprising a braking device as outlined above. In an exemplary embodiment of such a passenger conveyor the braking device may be an auxiliary braking device.

While the invention has been described with reference to exemplary embodiments, it will be understood by those skilled in the art that various changes may be made and equivalents may be substituted for elements thereof without departing from the scope of the invention. In addition, many modifications may be made to adapt the particular situation or material to the teachings of the invention without departing from the essential scope thereof. Therefore it is intended that the invention not be limited to the particular embodiments disclosed, but that the invention will include all embodiments falling within the scope of the appended claims.

The invention claimed is:

1. A braking device for a passenger conveyor having at least one moveable part comprising at least one projection on a side of the moveable part, the projection projecting away from a surface on the side of the moveable part at least partially in a direction that is generally parallel to an axis of rotation about which the moveable part rotates, the surface being generally perpendicular to the axis of rotation, the braking device comprising:
    a braking element having a braking portion that is selectively engageable with the moving part,
    the braking element being moveable in a first direction into an engagement position where the braking element engages the projection on the moveable part,
    the braking element being moveable in a second, different direction from the engagement position to a braking position, the braking element moving into the braking position responsive to movement of the moveable part urging the braking element toward the braking position,
    the braking element blocking movement of the moveable part beyond the braking position once the braking element reaches the braking position, and
    a stop member that an abutment surface of the braking element is received against in the braking position, engagement between the stop member and the abutment surface preventing movement of the braking element and the moveable part beyond the braking position,
    wherein the braking element comprises a shaft having one end configured to engage the moveable part,
    wherein the first direction is aligned with a longitudinal axis of the shaft and the second direction is transverse to the first direction.

2. The device of claim 1, wherein the braking element moves linearly in the first direction and the braking element pivotally moves in the second direction.

3. The device of claim 2, wherein the braking element pivotally moves in the second direction about a pivot axis that is parallel with an axis of rotation of the moveable element.

4. The device of claim 1, wherein an angle between a first orientation of a longitudinal axis of the shaft in the engagement position and a second orientation of the longitudinal axis of the shaft in the braking position is between 10 degrees and 45 degrees.

5. The device of claim 4, wherein the angle is approximately 25 degrees.

6. A braking device for a passenger conveyor having at least one moveable part with at least one projection on a side of the moveable part, the projection projecting away from a surface of the moveable part at least partially in a direction that is generally parallel to an axis of rotation about which the moveable part rotates, the braking device comprising:
    a braking element having a braking portion that is selectively engageable with the moving part,
    the braking element being moveable in a first direction into an engagement position where the braking element engages the projection on the moveable part,
    the braking element being moveable in a second, different direction from the engagement position to a braking position, the braking element moving into the braking position responsive to movement of the moveable part urging the braking element toward the braking position,
    the braking element blocking movement of the moveable part beyond the braking position once the braking element reaches the braking position, and
    a stop member that an abutment surface of the braking element is received against in the braking position, engagement between the stop member and the abutment surface preventing movement of the braking element and the moveable part beyond the braking position;
    wherein the stop member comprises a wedge shaped portion defining an abutment surface against which the abutment surface of the braking element abuts in the braking position.

7. The device of claim 6, wherein the abutment surface is defined on a surface of the wedge shaped portion tapering toward the moveable part with respect to the second direction.

8. The device of claim 7, wherein the abutment surface is inclined with respect to the second direction at an angle between 1 degree and 20 degrees.

* * * * *

UNITED STATES PATENT AND TRADEMARK OFFICE
CERTIFICATE OF CORRECTION

PATENT NO. : 9,803,708 B2
APPLICATION NO. : 13/944210
DATED : October 31, 2017
INVENTOR(S) : David Lazar and Martin Vrsecky Page 1 of 1

It is certified that error appears in the above-identified patent and that said Letters Patent is hereby corrected as shown below:

In the Claims

In Claim 1, Column 11, Line 35; after "engageable with" replace "the moving part" with --the moveable part--

In Claim 6, Column 12, Line 25; after "engageable with" replace "the moving part." with --the moveable part.--

Signed and Sealed this
Twenty-third Day of October, 2018

Andrei Iancu
*Director of the United States Patent and Trademark Office*